(12) United States Patent
O'Driscoll

(10) Patent No.: US 7,107,041 B1
(45) Date of Patent: Sep. 12, 2006

(54) METHOD FOR MONITORING AUTHENTICATION PERFORMANCE IN WIRELESS COMMUNICATION NETWORKS

(75) Inventor: Barry O'Driscoll, Gorey (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/447,179

(22) Filed: Nov. 22, 1999

(51) Int. Cl.
  *H04M 1/66* (2006.01)
(52) U.S. Cl. .................. 455/411; 455/410; 455/450
(58) Field of Classification Search ............. 370/329, 370/321, 337, 347, 442, 315, 319; 455/414, 455/435, 411, 410, 422, 433, 432.1, 436, 455/438, 445, 450, 435.1, 414.1
See application file for complete search history.

(56) References Cited

U.S. PATENT DOCUMENTS

| | | | | |
|---|---|---|---|---|
| 5,329,573 A | * | 7/1994 | Chang et al. ............. | 455/411 |
| 5,455,863 A | * | 10/1995 | Brown et al. ............. | 380/247 |
| 5,708,710 A | * | 1/1998 | Duda ...................... | 380/247 |
| 5,850,445 A | * | 12/1998 | Chan et al. ............... | 380/247 |
| 5,933,784 A | * | 8/1999 | Gallagher et al. ........ | 455/552.1 |
| 5,937,345 A | | 8/1999 | McGowan et al. ........ | 455/410 |
| 5,970,144 A | * | 10/1999 | Chan et al. ............... | 380/247 |
| 6,128,389 A | * | 10/2000 | Chan et al. ............... | 380/247 |
| 6,173,174 B1 | * | 1/2001 | Jacobs .................... | 455/411 |
| 6,226,511 B1 | * | 5/2001 | Jacobs et al. ............ | 455/411 |
| 6,236,852 B1 | * | 5/2001 | Veerasamy et al. ....... | 455/411 |
| 6,301,473 B1 | * | 10/2001 | Nguyen et al. .......... | 455/417 |
| 6,338,140 B1 | * | 1/2002 | Owens et al. ............ | 713/168 |
| 6,397,056 B1 | * | 5/2002 | Bugnon et al. .......... | 455/411 |
| 6,501,950 B1 | * | 12/2002 | Smith et al. ............. | 455/423 |
| 6,795,444 B1 | * | 9/2004 | Vo et al. ................. | 370/401 |
| 6,928,277 B1 | * | 8/2005 | Ene ........................ | 455/411 |
| 2003/0236980 A1 | * | 12/2003 | Hsu ........................ | 713/168 |
| 2005/0037765 A1 | * | 2/2005 | Rajkotia et al. .......... | 455/450 |
| 2005/0090232 A1 | * | 4/2005 | Hsu ........................ | 455/411 |
| 2005/0113094 A1 | * | 5/2005 | Dumser et al. .......... | 455/439 |

OTHER PUBLICATIONS

Mohan, S.; Privacy and authentication protocols for PCS Personal Communications, IEEE vol. 3, Issue 5, Oct. 1996 pp. 34-38 Digital Object Identifier 10.1109/98.542236.*

Yu, J.I.;IS-41 for mobility managementUniversal Personal Communications, 1992. ICUPC '92 Proceedings., 1st International Conference on Sep. 29-Oct. 1, 1992 pp. 06.03/1-06.03/5 Digital Object Identifier 10.1109/ICUPC.1992.240782.*

Standard Search Report for RS 104227US Completed Apr. 26, 2000.

* cited by examiner

*Primary Examiner*—Sonny Trinh

(57) ABSTRACT

A method for monitoring network authentication performance in wireless communication systems is disclosed, whereby a standardized message will be used to enable external reporting of a selection of (or all) successful Global Challenges. A network operator can select which Global Challenge results are to be reported, based on one or more factors such as, for example: subscriber number series (i.e., if a subscriber's number is within a predetermined range, then a successful Global Challenge can be reported); predetermined periodicity (i.e., the $n^{th}$ successful Global Challenge for a subscriber or MSC/VLR can be reported); access type (i.e., a successful Global Challenge for a Registration request, Originating Calls, Terminating Calls, and/or Originating Short Messages can be reported), etc.

7 Claims, 4 Drawing Sheets

METHOD FOR MONITORING AUTHENTICATION PERFORMANCE IN WIRELESS COMMUNICATION NETWORKS

BACKGROUND OF THE INVENTION

1. Technical Field of the Invention

The present invention relates in general to the wireless communications field and, in particular, to an improved method for monitoring authentication performance in wireless communication networks.

2. Description of Related Art

The Global Challenge (GC) authentication procedure currently used in Time Division Multiple Access/Frequency Division Multiple Access (TDMA/FDMA) mobile communication systems allows a network operator to validate on the control channel, mobile subscribers' access requests to the network. Each subscriber maintains a unique set of secret authentication keys (i.e., Shared Secret Data or SSD information). This SSD information is used in certain calculations for the authentication procedure. The subscribers' Home Location Register (HLR) also maintains a copy of the subscribers' secret authentication keys.

The way most operators have implemented their existing TDMA/FDMA mobile networks, the Mobile Services Switching Center/Visitor Location Register (MSC/VLR) also maintains a copy of the subscribers' secret authentication keys or SSD information. The main purpose for maintaining the subscriber SSD information in an MSC/VLR is to avoid ANSI-41 message signalling congestion on the transmission link or interface between the MSC and HLR (Reference Point C as defined in the TIA/EIA-41 protocol).

There are a number of different settings needed to ensure that network subscribers are being globally challenged. Examples of these settings are cell indicators and the different access types which are to be globally challenged.

A significant problem with the GC authentication procedures used in existing TDMA/FDMA mobile systems is related to the use of these procedures by an external operator (i.e., an operator for a different network's service provider). For example, if a home network's MSC/VLR maintains a copy (which is done in most networks) of a subscriber's SSD information to be used for authentication purposes, the only ANSI-41 message signalling (apart from an initial access request) conveyed outside the MSC for the GC operation is an Authentication Failure report. This report is generated when a network determines that a fraudulent access request has been made. Conversely, if a network does not determine that a fraudulent access request has been made, then there is no GC-related report generated by the network that would allow an external operator to determine whether or not that network's GC function is still active and configured correctly. In other words, for existing TDMA/FDMA mobile networks, an external operator has no proof that another service provider's network (e.g., cooperating in accordance with a valid roaming agreement) has an active GC function. This problem is particularly significant for an external operator of a network having a plurality of roaming agreements with other networks, because the external operator needs assurance that its subscribers are being globally challenged as they roam.

The existing approaches used by network operators to extract authentication information from an MSC are typically proprietary. For example, one application, MDATA, is a proprietary application developed and used by the Ericsson Corporation to extract subscriber authentication information and results from an Ericsson MSC. This approach solves the above-described GC authentication problem to a great extent for Ericsson. However, a significant problem with this and similar proprietary approaches is that an external operator is unable to access the application directly in order to extract subscriber authentication results from the MSC where the MS is registered. Additionally, the proprietary authentication applications being used typically do not provide access to data across networks (i.e., no inter-network data transfers are performed). Notably, at present, there are no standardized solutions for reporting a successful GC, neither within one's own network nor to an external network. Nevertheless, as described in detail below, the present invention successfully solves the above-described problems and other related problems.

SUMMARY OF THE INVENTION

In accordance with a preferred embodiment of the present invention, a method for monitoring network authentication performance in wireless communication systems is provided, whereby a standardized message is used to enable external reporting of a selection of (or all) successful GCs. Any network operator can select which GC results are to be reported to external operators, based on one or more factors such as, for example: subscriber number series (i.e., if a subscriber's number is within a predetermined range, then a successful GC can be reported); predetermined periodicity (i.e., the $n^{th}$ successful GC for a subscriber or MSC/VLR can be reported); access type (i.e., a successful GC for a Registration request, Originating Calls, Terminating Calls, and/or Originating Short Messages can be reported), or the successful GCs detected within a specified time duration, SubscriberHLR address, etc.

An important technical advantage of the present invention is that a method is provided for assuring external operators that the GC function is active and appropriately configured for roaming subscribers' terminals.

Another important technical advantage of the present invention is that a non-proprietary, standardized method is provided for assuring external operators that the GC function is active and appropriately configured for roaming subscribers' terminals.

Still another important technical advantage of the present invention is that a method is provided for enhancing the confidence of network operators working together under national or international roaming agreements.

Yet another important technical advantage of the present invention is that a method for monitoring network authentication performance is provided which is hardware independent.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5B of the drawings, like numerals being used for like and corresponding parts of the various drawings.

Essentially, in accordance with a preferred embodiment of the present invention, a method for monitoring network authentication performance in wireless communication systems is provided, whereby a standardized message is used to enable external reporting of a selection of (or all) successful GCs. Any network operator can select which GC results are to be reported to external operators, based on one or more factors such as, for example: subscriber number series (i.e., if a subscriber's number is within a predetermined range, then a successful GC can be reported); predetermined periodicity (i.e., the $n^{th}$ successful GC for a subscriber or MSC/VLR can be reported); access type (i.e., a successful GC for a Registration request, Originating Calls, Terminating Calls, and/or Originating Short Messages can be reported), or the successful GCs detected within a specified time duration, SubscriberHLR address, etc.

Figure 1:
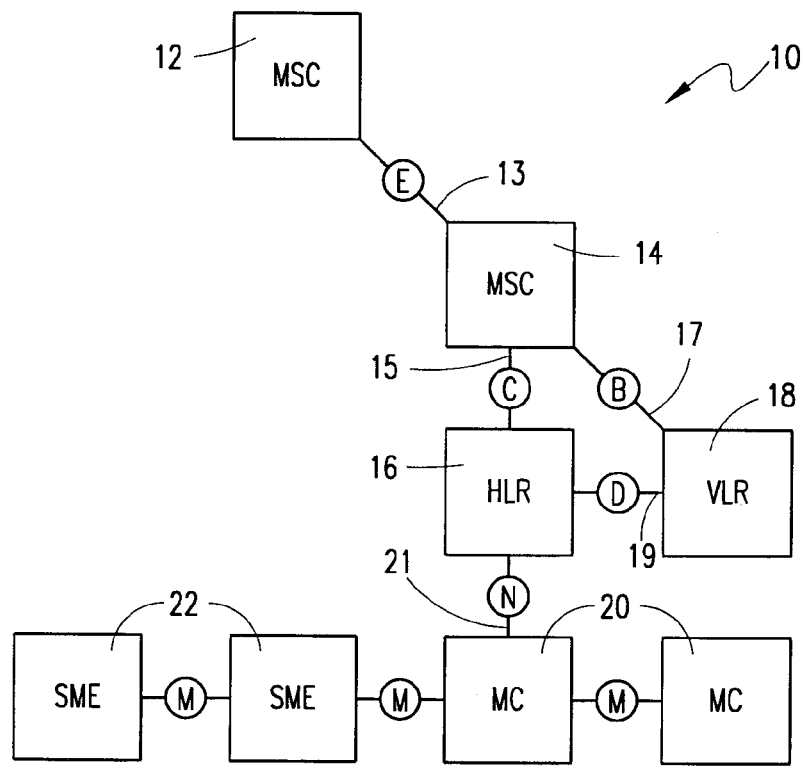
FIG. 1 is a block diagram of an exemplary mobile communications network, which can be used to implement a preferred embodiment of the present invention.

Specifically, FIG. 1 is a block diagram of an exemplary mobile communications network 10, which can be used to implement a preferred embodiment of the present invention. Although the exemplary network 10 shown in FIG. 1 is an ANSI-41 network (i.e., designed in accordance with the ANSI-41 protocol), the invention is not intended to be so limited and can be implemented in any appropriate type of TDMA/FDMA or other mobile communications network (e.g., Advanced Mobile Phone System, i.e., AMPS network, etc.). The basic structure and operation of ANSI-41 networks are known in the communications field. However, for clarity, it is useful herein to briefly describe the entities shown in FIG. 1.

As such, the exemplary network 10 includes two MSCs (Mobile Switching Centers in ANSI-41 networks) 12 and 14 coupled together by a transmission link 13 (Reference Point E interface under the ANSI-41 protocol). An MSC functions primarily as an interface for user traffic between the network (10) and other MSCs in the same or other mobile networks, or other public switched networks. An HLR 16 is coupled to the MSC 14 by a transmission link 15 (Reference Point C interface), to a VLR 18 by a transmission link 19 (Reference Point D interface), and to a Message Center (MC) 20 by a transmission link 21 (Reference Point N interface). An MC functions primarily to store and forward short text messages. The VLR 18 is also coupled to the MSC 14 by a transmission link 17 (Reference Point B interface) The MC 20 is coupled to a second MC and a Short Message Entity (SME) 22 by respective transmission links (Reference Point M interfaces). An SME functions primarily to compose and decompose short text messages (i.e., short messages).

Figure 2:
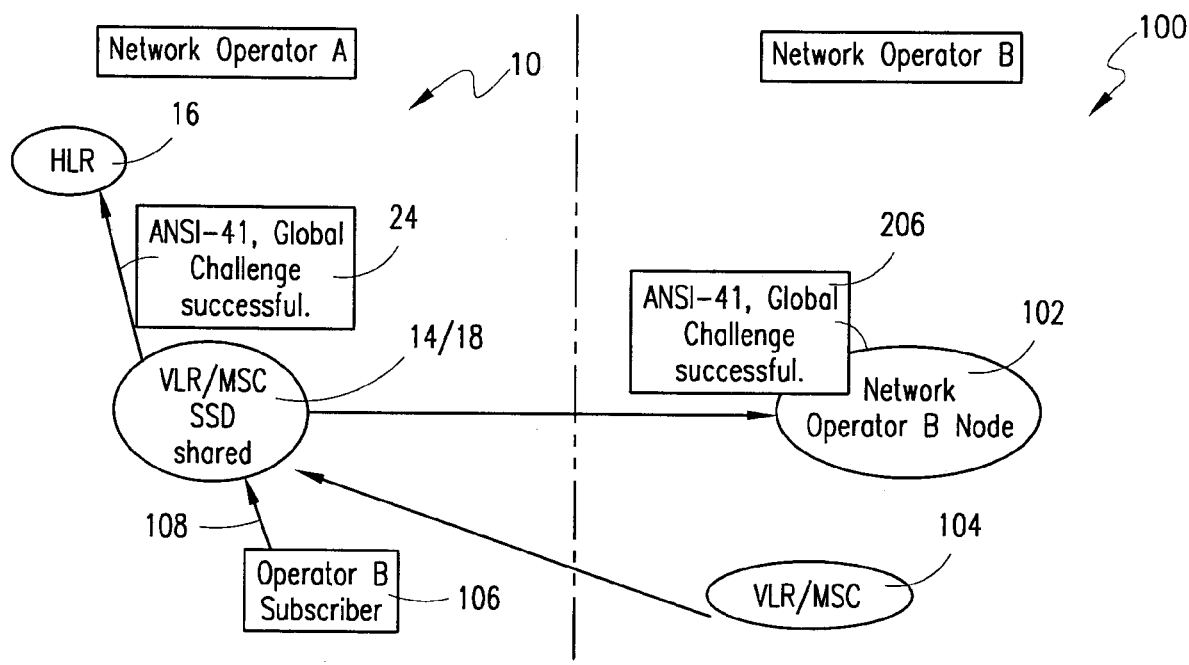
FIGS. 2, 3 and 4A are related diagrams that illustrate how a mobile communications network can report GC information externally (e.g., to the operator of another network), in accordance with a preferred embodiment of the present invention.
Figure 3:
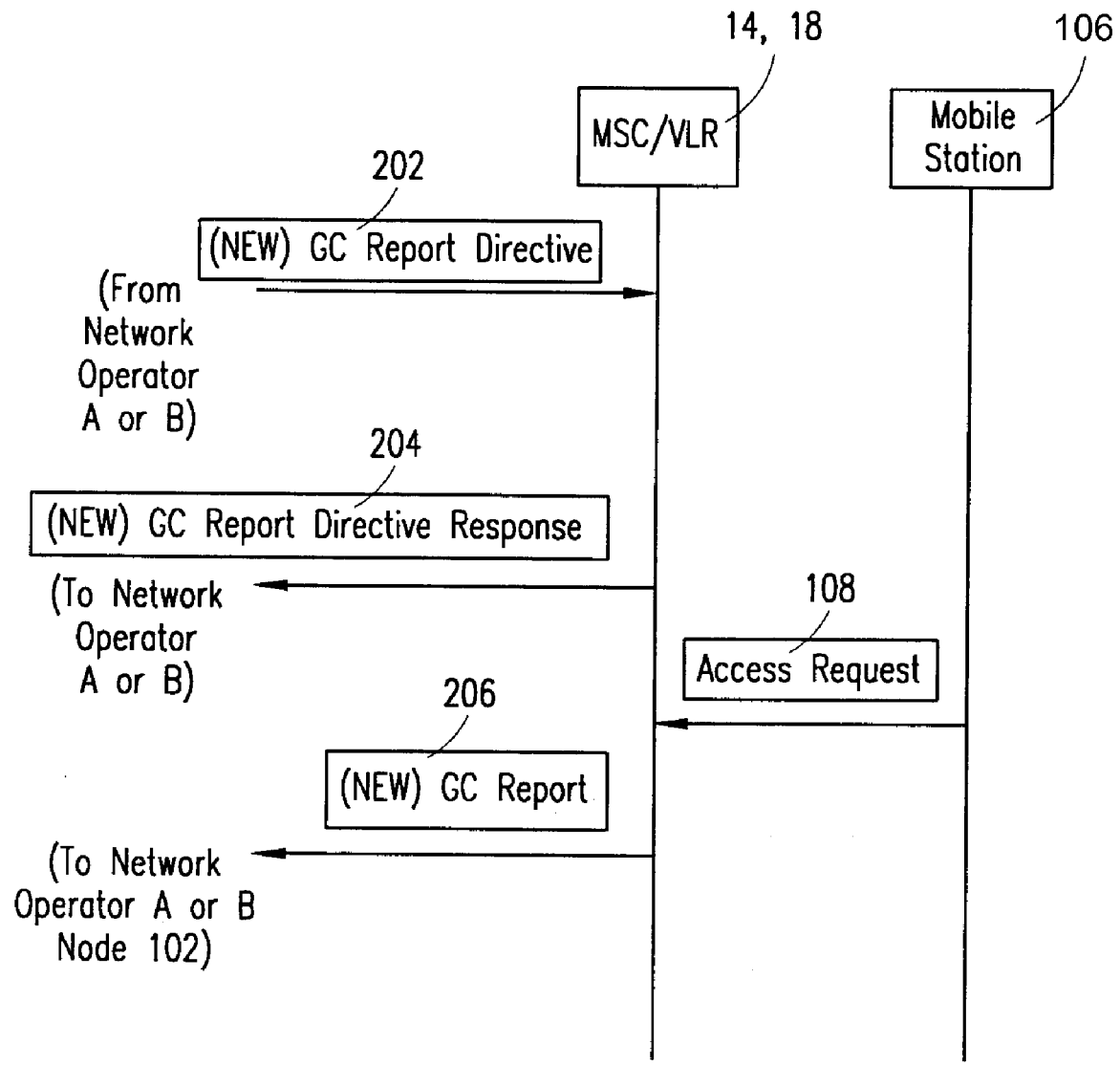
Figure 4A:
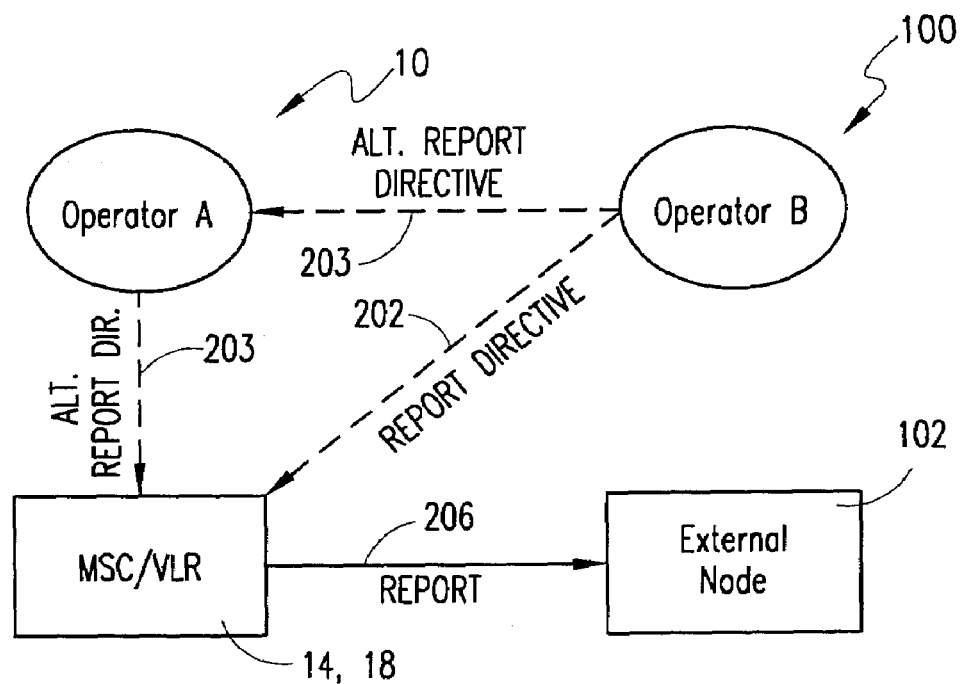

FIGS. 2, 3 and 4A are related diagrams that illustrate how a mobile communications network (10) can report GC information externally (e.g., to operator B of network 100), in accordance with a preferred embodiment of the present invention. Referring to FIGS. 1–4A, for this exemplary embodiment, a mobile station (MS) 106 subscriber of an external network operator B (100) transmits an access request 108 for network A (10). For this embodiment, it can be assumed that network operators A and B have a valid inter-network roaming agreement, and the subscriber's SSD information has been conveyed from the external MSC/VLR 104, or directly from the external HLR, to the network MSC/VLR (14/18) and stored. It can also be assumed that network A (10) has globally challenged the MS 106, and the GC has been successful (e.g., the MS's identity has been authenticated using the stored SSD information). The GC results 24 and 206 (successful, in this case) are conveyed to the HLR 16 and/or a node in the external operator's network (102) and stored.

Focusing on the sequence diagram shown in FIG. 3 and the block diagram shown in FIG. 4A, in accordance with the preferred embodiment, a set of ANSI-41 standard messages is created primarily to allow external reporting of successful GC results. For example, at any appropriate time, network operator B (100) sends a standard message (e.g., GC Report Directive) 202 in an ANSI-41 signalling message format to the MSC 14, which directs the MSC 14 to create a GC Report (successful) for an external B subscriber's access request, and convey the GC Report message (206) to the external operator's network node 102. For this embodiment, the external operator's network node (102) can be an HLR. Also, for this embodiment, the GC Report Directive message 202 for a successful GC can be used for a plurality of external subscribers and preferably includes one or more of the following parameters (using ANSI-41 notation convention for an INVOKE component): INDICATOR (e.g., indicates presence of a GC Report Directive message); GC REPORT ACCESS TYPE; GC REPORT PERIOD START; GC REPORT PERIOD END; GC REPORT FREQUENCY; GC REPORT HLR ADDRESS; GC REPORT MSCID BEGINNING; GC REPORT MSCID END. The MSC 14 acknowledges a successfully received GC Report Directive message by sending a GC Report Directive Response message 204 (preferably in the ANSI-41 format) to the operator of network B (100). For this embodiment, the GC Report Directive Response message is sent to the network operator as an acknowledgment message and is not required to include any specific GC-related parameter.

If an access request by an external MS (e.g., 106) produces a successful GC Report message (206) that includes one or more of the above-described GC parameters, a GC Report 206 is sent to an input node (102) in the external network B (100), which can make the report information known to the operator of network B. For this embodiment, the input node (102) in the external network B can be an HLR, for example. Also, the GC Report message 206 is conveyed in an appropriate ANSI-41 signalling message format. In this case, the GC Report message 206 includes the following parameters: GC REPORT (identifies existence of GC Report); ESN (Electronic Serial Number of the external MS); MSID (external MS's identification); GC REPORT TIME; and GC REPORT SUCCESS ACCESS TYPES. A more detailed description of these new GC parameters is provided below. In this way, by conveying the above-described messages in an ANSI-41 format, the successful results of a network's GC can be provided to an external operator.

Alternatively, as shown in FIG. 4A, the operator of network B (100) can send a GC Report Directive message (203) via an alternate route through network A (10) via, for example, the HLR 16 in network A. One reason the Report Directive message might be routed via the network A HLR is that the operator of network A may wish to have total control over the ANSI-41 signalling in and out of the MSC/VLR (14/18). An acknowledgment message (e.g., Report Directive Response) can be sent back to the operator of network B either directly to the node B (102) or via network A.

Figure 4B:
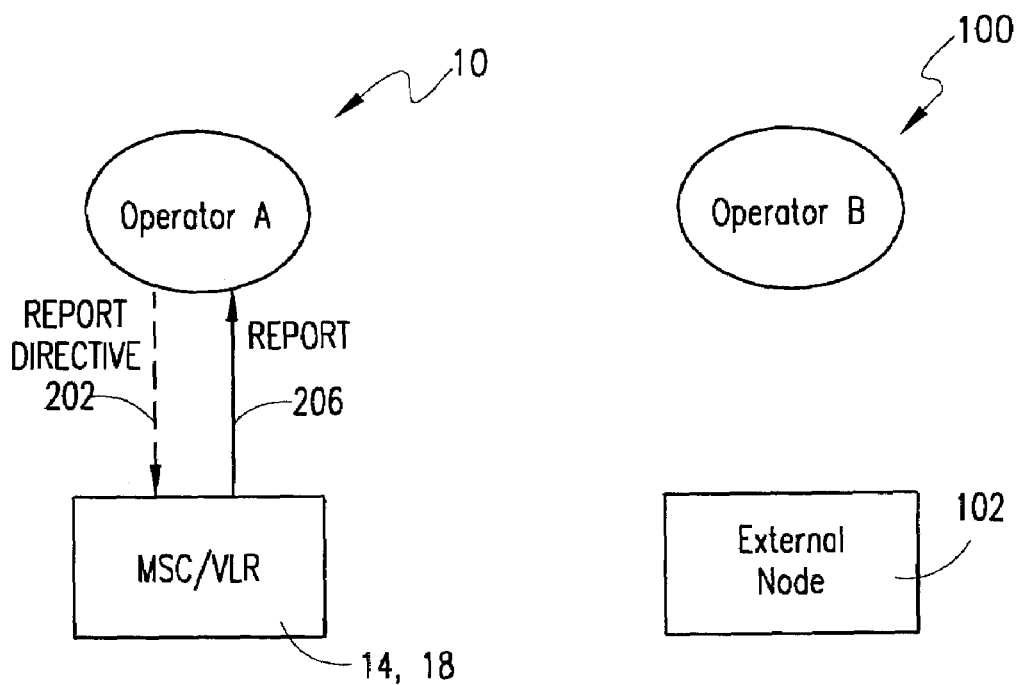
FIG. 4B is a block diagram that illustrates how a mobile communications network can report GC information internally, in accordance with a second embodiment of the present invention.

FIG. 4B is a block diagram that illustrates a second embodiment of the present invention. Referring to FIG. 4B, a GC successful order message (e.g., GC Report Directive) 202 can be sent to the primary network's MSC (14) from the operator (A) of that network via network A's HLR (16). An acknowledgment message (GC Report Directive Response) is sent to acknowledge that the MSC has received the GC successful order message (GC Report Directive). For example, the operator of network A can request one or more successful GC Reports (206) for MSs within network A. As another example, the operator of network A can request one or more successful GC Reports (206) for operator B's MSs roaming in network A.

Figure 5A:
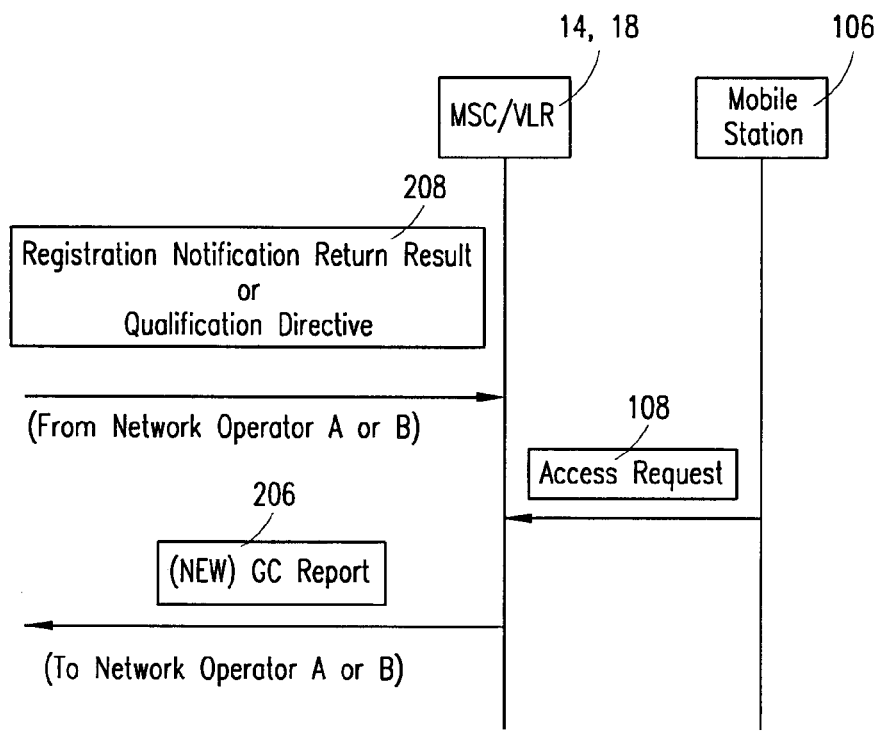
FIGS. 5A and 5B are related sequence diagrams that illustrate a third embodiment of the present invention.
Figure 5B:
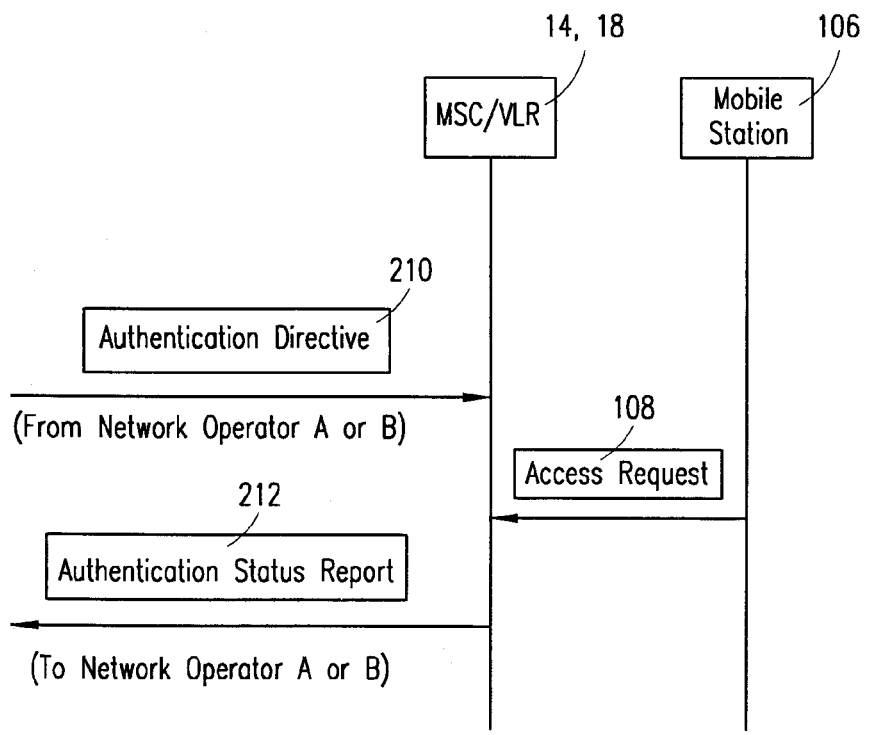

FIGS. 5A and 5B are related sequence diagrams that illustrate a third embodiment of the present invention. Referring to FIG. 4A, an order for a network (10) to report a successful GC for a specific subscriber can be conveyed to an MSC (14) in an existing ANSI-41 message. For example, the existing ANSI-41 Registration Notification Return Result (RegNot Return Result) message or Qualification Directive (QualDir) message (208) can be modified to include additional parameters for this purpose, such as, for example, GC Report Access Types, GC Report Period Start and End, and GC Report Frequency. In response to an external network subscriber's access request (108), a successful GC based on one or more of the parameters included in the order message (e.e.g., RegNot Return Result or QualDir) can be reported to network A or B's operators in the above-described GC Report message (206).

FIG. 5B is a sequence diagram that illustrates a different aspect of the third embodiment. Referring to FIG. 5B, an order for a network (10) to report a successful GC for a specific subscriber can be conveyed to an MSC (14) in another existing ANSI-41 message. For example, the existing ANSI-41 Authentication Directive message (210) can be modified to include additional parameters for this purpose, such as, for example, GC Report Access Types, GC Report Period Start and End, and GC Report Frequency. In response to an external network subscriber's access request (108), a successful GC based on one or more of the parameters included in the order message can be reported to network A or B's operators in a modified Authentication Status Report message (212).

The following Table includes a description and format for each of the new GC parameters described above, which can be included in a report order message, response to a report order message, and/or a report message, in accordance with the present invention.

TABLE 1

GC Report Access Types - Access types for which successful GCs are reported.

| HGFEDCBA | Octet | Value | |
|---|---|---|---|
| 00000000 | 1 | 0 | No successful GCs to be reported. |
| 00000001 | 1 | 1 | Report successful GCs for all access types. |
| 00000010 | 1 | 2 | Report successful GCs for registrations. |
| 00000100 | 1 | 4 | Report successful GCs for originating calls. |
| 00001000 | 1 | 8 | Report successful GCs for terminating calls. |
| 00010000 | 1 | 16 | Report successful GCs for originating short messages. |

GC Report Period Start, GC Report Period End - Report successful GCs that occur during a predetermined period of time (between GC Report Period Start and End).
GC Report Frequency - Report every $n^{th}$ successful GC.

| HGFEDCBA | Octet | Value |
|---|---|---|
| | 1 | n |

GC Report HLR Address - Report successful GCs for subscribers registered in a specific HLR.
GC Report MSCID Start, GC Report MSCID End - Report successful GCs for subscribers with subscriber numbers in a predetermined range (between MSCID Start and End).
GC Report

| HGFEDCBA | Octet | Value | |
|---|---|---|---|
| 00000000 | 1 | 0 | Not used. |
| 00000001 | 1 | 1 | GC successful. |

GC Report Success Access Types

| HGFEDCBA | Octet | Value | |
|---|---|---|---|
| 00000000 | 1 | 0 | Not used. |
| 00000001 | 1 | 1 | Report is for registration access GC. |
| 00000010 | 1 | 2 | Report is for originating call GC. |
| 00000011 | 1 | 3 | Report is for terminating call GC. |
| 00000100 | 1 | 4 | Report is for originating Short Message Service GC. |

GC Report Time - The instant of time that a successful GC occurred.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for monitoring authentication performance in a wireless communication network, comprising the steps of:
   sending a Global Challenge Report Directive message to a mobile switching center in said wireless communication network, said Global Challenge Report Directive message including at least one authentication parameter;
   determining whether an access request made to said wireless communication network is authenticated based on said at least one authentication parameter; and
   if said access request is authenticated based on said at least one authentication parameter, said mobile switching center transmitting a Global Challenge Report to said external wireless communication network.

2. The method of claim 1, further comprising the step of said mobile switching center transmitting an Global Challenge Report Directive Response message responsive to said a Global Challenge Report Directive message.

3. The method of claim 1, wherein said Global Challenge Report Directive message is formatted in accordance with an ANSI-41 protocol.

4. The method of claim 1, wherein said wireless communication network utilizes an ANSI-41 network.

5. A system for monitoring authentication performance in a wireless communication network, comprising:
   a mobile switching center associated with said wireless communication network
   an external network node, said external network node coupled to said mobile switching center by an inter-network transmission interface;
   wherein said external network node senses a Global Challenge Report Directive message to said mobile switching center, said Global Challenge Report Directive message including at least one authentication parameter; and
   wherein said mobile switching center determines whether an access request made to said wireless communication network is authenticated based on said at least one authentication parameter, said mobile switching center further transmitting a Global Challenge Report to said external node if said access request is authenticated based on said at least one authentication parameter.

6. The system of claim 5, wherein said mobile switching center further transmits Global Challenge Report Directive Response message responsive to said a Global Challenge Report Directive message.

7. The system of claim 5, wherein said wireless communication network comprises an ANSI-41 network.

* * * * *